United States Patent
Liao

(10) Patent No.: US 6,872,023 B2
(45) Date of Patent: Mar. 29, 2005

(54) STRUCTURE OF STEPLESSLY ADJUSTING ANGLE FOR A CYMBAL

(76) Inventor: Tsun-Chi Liao, 1F, No. 7, Lane 545, Sec. 2, Chun-Kung Rd., Taichung City (TW)

( * ) Notice: Subject to any disclaimer, the term of this patent is extended or adjusted under 35 U.S.C. 154(b) by 0 days.

(21) Appl. No.: 10/388,501

(22) Filed: Mar. 17, 2003

(65) Prior Publication Data

US 2004/0184895 A1 Sep. 23, 2004

(51) Int. Cl.$^7$ .................................................. F16D 3/00
(52) U.S. Cl. ........................... 403/84; 403/290; 403/110
(58) Field of Search .............................. 403/83, 84, 85, 403/290, 93, 94, 95, 91, 96, 97, 98, 99, 100, 110

(56) References Cited

U.S. PATENT DOCUMENTS

| | | | | |
|---|---|---|---|---|
| 5,836,561 A | * | 11/1998 | Liao | 248/291.1 |
| 5,918,997 A | * | 7/1999 | Hsieh | 403/104 |
| 6,413,006 B1 | * | 7/2002 | Neugart | 403/344 |
| 6,474,900 B2 | * | 11/2002 | Feng | 403/322.4 |

* cited by examiner

Primary Examiner—John R. Cottingham
(74) Attorney, Agent, or Firm—Birch, Stewart, Kolasch & Birch, LLP

(57) ABSTRACT

A structure of steplessly adjusting angle for a cymbal of the invention includes an upper rod for screwing a cymbal on its top, and a lower rod that is pivotally connected to the upper rod. Also, an appended portion is provided at one side of the head of the lower rod, and a bearing body can be inserted into the center of the appended portion so that the upper rod and the lower rod can be united. Besides, a clamping head designed to have two corresponding clamping portions is provided on the bottom of the upper rod. Also, a clamping slot is provided at top of the clamping head in the axial direction, and the clamping slot is bent laterally outwards to form an opening. The central hole of the clamping head is sleeved onto the appended portion of the lower rod so that the components ready to be combined horizontally can be united. Thus, the upper rod can achieve an effect of stepless angle fine-tuning, and the operation of spanner twisting will not be limited by the space.

9 Claims, 7 Drawing Sheets

STRUCTURE OF STEPLESSLY ADJUSTING ANGLE FOR A CYMBAL

FIELD OF THE INVENTION

The invention relates to a structure of steplessly adjusting angle for a cymbal and, more particularly, to a design of structure that can facilitate a drummer's performance by steplessly adjusting angle for a cymbal and can avoid being obstructed by the lower rod when setting up the cymbal for performance.

BACKGROUND OF THE INVENTION

Referring to FIG. 1, a fixed structure of adjusting angle for a cymbal in the prior art includes a central rod 1; a head 2 provided on top of the central rod 1; a round-shaped sleeve-in portion 3 provided outwardly at one side of the head 2; a plurality of engaging teeth 4 distributed on the sleeve-in portion 3; an upper rod 5; two felts 6 provided on top of the upper rod 5 for clamping on a cymbal (not shown); a ring-shaped casing 7 provided beneath the upper rod 5, wherein an opening is provided at one side of the ring-shaped casing 7 while a plurality of embedded teeth 8 are provided around the inner wall of the ring-shaped casing 7 at the other side of the casing 7, and the casing 7 is sleeved onto the sleeve-in portion 3; a screw bolt 9, which enters from a square hole 10 located on the outer side of the ring-shaped casing 7, enabling the embedded teeth 8 of the ring-shaped casing 7 to be engaged with the engaging teeth 4 of the sleeve-in portion 3, and the screw bolt 9 will also pass through a central hole 11 on the head 2 of the central rod 1; and finally a screw nut 12 provided for screwing the screw bolt 9 so that the central rod 1 can be conjoined with the upper rod 5 as a whole. If adjusting angle between a cymbal and a drummer is required, the screw nut 12 has firstly to be unscrewed, then the angle between the upper rod 5 and the drummer will be adjusted, and finally the screw nut 12 will be screwed back. In other words, by means of interlocking relation between the embedded teeth of the ring-shaped casing 7 and the engaging teeth 4 on the head 2 of the central rod 1, the angle adjusting for the upper rod 5 can be achieved. However, such teeth-to-teeth interlocking relation cannot obtain an effect of stepless fine-tuning; therefore, such conventional method needs to be improved.

SUMMARY OF THE INVENTION

The primary object of the invention is to provide a structure of steplessly adjusting angle for a cymbal, which includes an upper rod and a lower rod pivotally connected to each other, wherein a clamping head that is composed of two corresponding clamping portions pivotally connected together are provided on the bottom of the upper rod, and a central hole of the clamping head is sleeved onto an appended portion on the outer side of the lower rod. The clamping head can firmly hold the appended portion on the lower rod by clamping on the two clamping portions so as to steplessly adjust the angle of the cymbal on the upper rod.

Another object of the invention is to employ a design of clamping slot on the upper side of a central hole located in the clamping head of the upper rod so that the screw bolt that passes through the two clamping portions of the clamping head will not be obstructed by the lower rod when a spanner is applied on the screw bolt for twisting.

The objects and technical contents of the invention will be better understood through the description of the following two embodiments with reference to the drawings.

DETAILED DESCRIPTION OF THE PREFERRED EMBODIMENTS

Figure 1:
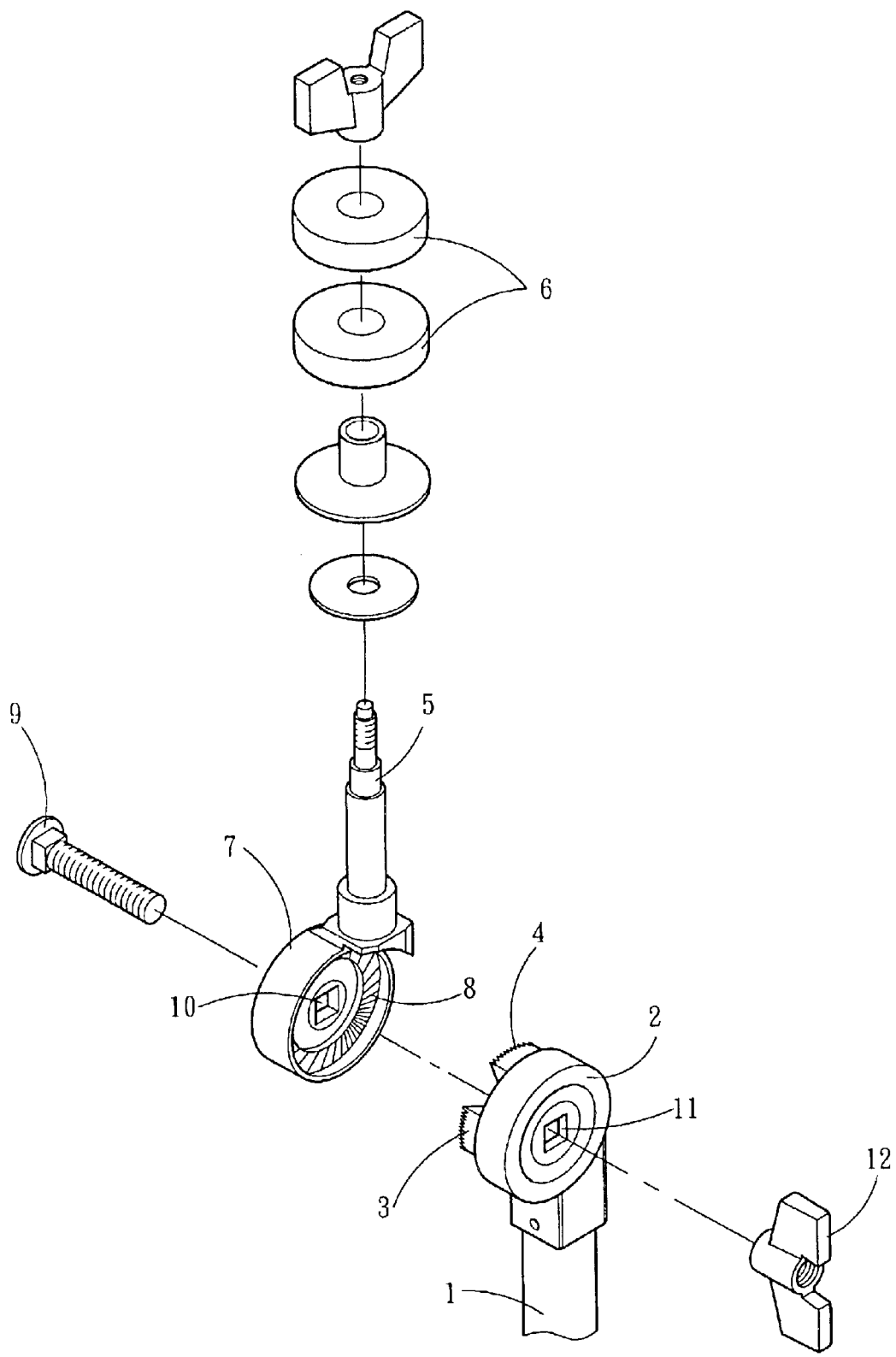
FIG. 1 is a three-dimensional exploded view showing a conventional fixed structure of adjusting angle for a cymbal.
Figure 2:
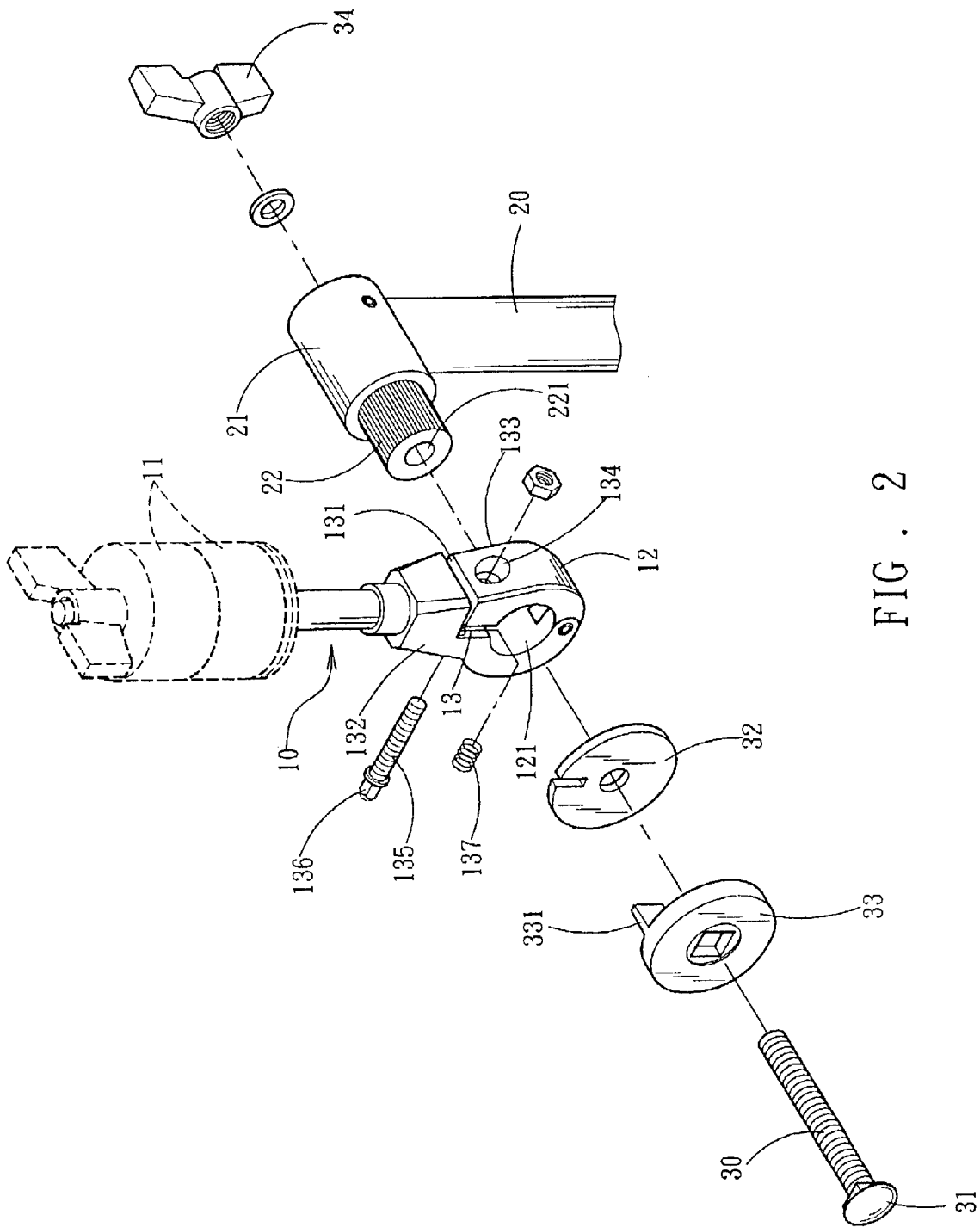
FIG. 2 is a three-dimensional exploded view of the first embodiment of the invention.
Figure 3:
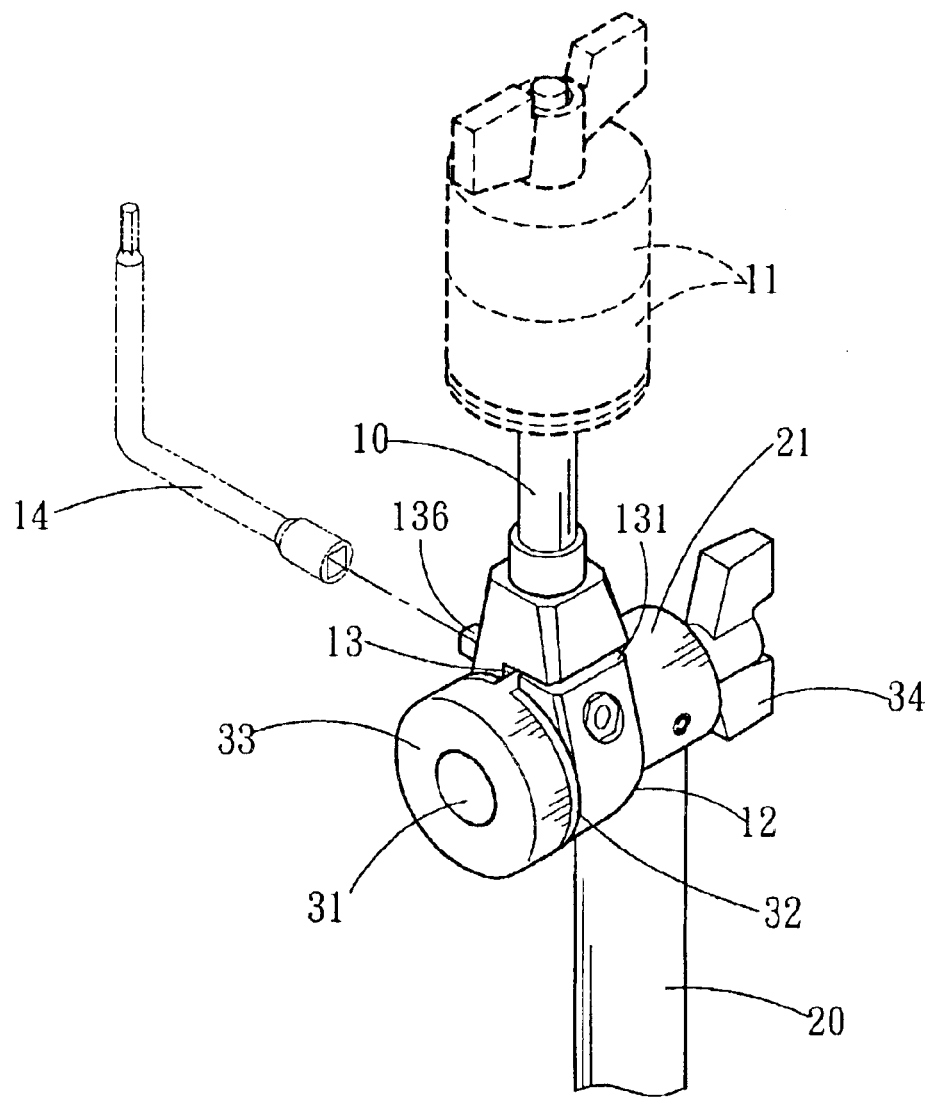
FIG. 3 is a three-dimensional assembly of the first embodiment of the invention.
Figure 4:
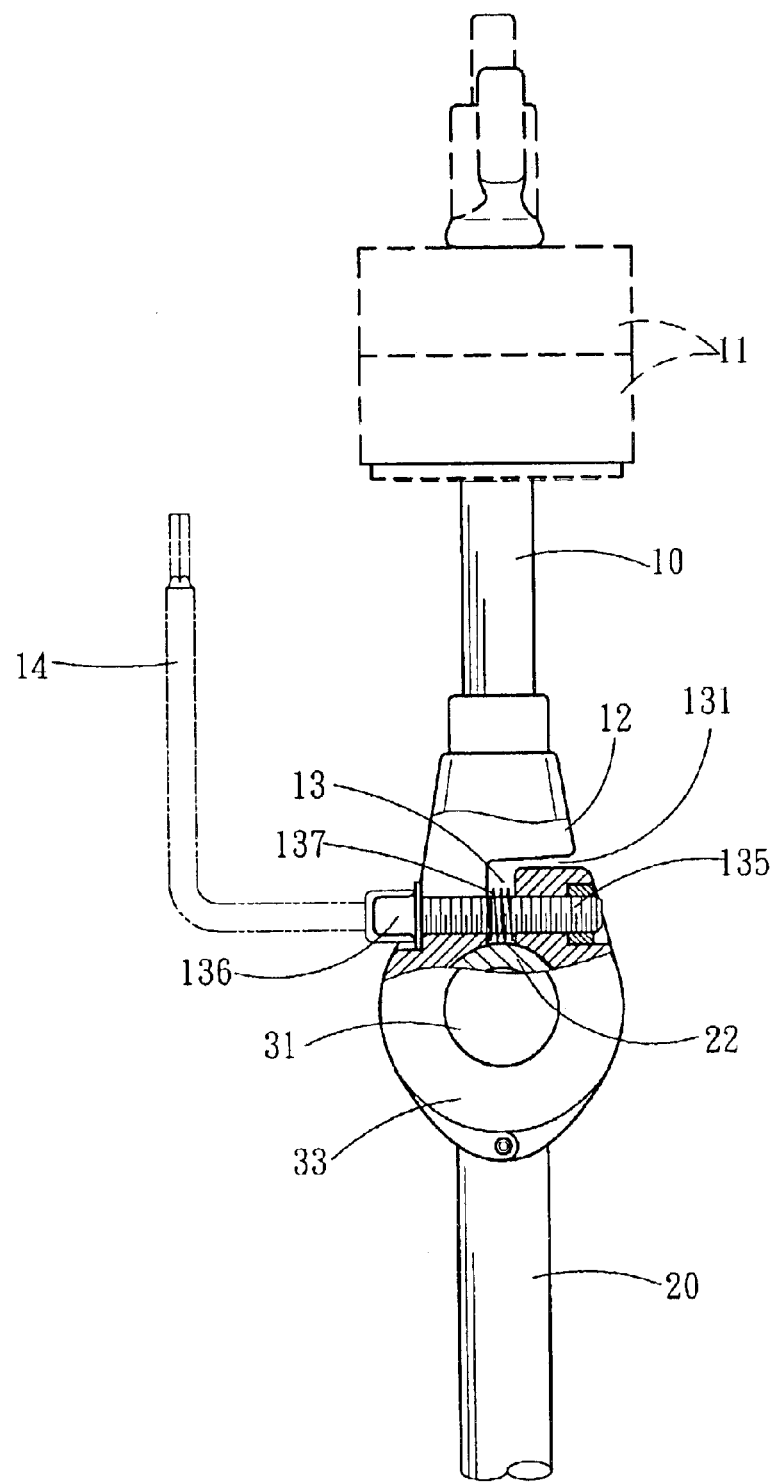
FIG. 4 is a front view of the first embodiment of the invention.

Referring to FIG. 2 and FIG. 4, the structure of steplessly adjusting angle for a cymbal of the invention includes following components:

an upper rod 10, wherein two felts 11 for shock-absorbing are provided on top of the upper rod 10 and penetrated by it so that a cymbal (not shown) can be clamped between the two felts 11; besides, a ring-shaped clamping head 12 is provided on bottom of the upper rod 10, wherein a central hole 121 is provided in the center of the clamping head 12; in addition, referring to FIG. 3, the bottom of a clamping slot 13 in the axial direction can pass through the central hole 121, whereas the top of the clamping slot 13 is bent laterally toward one side so that its opening 131 can face outwards; also, the clamping head 12 comprises one left clamping portion 132 and one right clamping portion 133 that are pivotally connected together, and the pivotally connected point of the two clamping portions 132 & 133 is located at their bottoms; moreover, a hole 134 is located on each of the two clamping portions 132 & 133 correspondingly, allowing a conjoining component such as a screw bolt 135 to go through, and the screw bolt 135 can be screwed by a screw nut so that the two clamping portions 132 & 133 can get closer to each other to diminish the size of the opening 131; and a L-shaped spanner 14 can be engaged with a head 136 of the screw bolt 135 to twist for tightening or loosening;

a lower rod 20, wherein a round-shaped head portion 21 is provided on top of the lower rod 20, and a column-shaped appended portion 22 is provided at one side of the head portion 21; besides, a core hole 221 is provided in the appended portion 22 passing through to another side of the head portion 21 of the lower rod 20; also, floral pattern veins are printed on the inner wall of the appended portion 22; and a bearing component such as a through bolt 30, wherein a bolt head 31 is provided on one end of the through bolt 30; also, a square block is provided at the inner side of the bolt head 31, while a soft washer 32 and a bearing body 33 are inserted in by the through bolt 30; besides, a shielding body 331 extends out from the inner side of the bearing body 33, and the square block at the inner side of the bolt head 31 can be sleeved into the square hole in the middle of the bearing body 33; and finally a butterfly nut 34 is provided on the other end of the through bolt 30 for screwing.

According to the foregoing structure, when assembling, first the central hole 121 on the clamping head 12 of the upper rod 10 will be sleeved onto the appended portion 22 of the lower rod 20, making the inner wall of the clamping head 12 closely contacted with the outer wall of the head portion 21 on the lower rod 20. Next, the screw bolt 135 will be inserted into the hole 134 on clamping portion 132 of the clamping head 12 and then into a spring 137 and afterwards into another hole 134 on clamping portion 133, and finally a screw nut will screw the screw bolt 135 tightly. As for the screwing operation, the spanner 14 can be engaged with the head 136 on the screw bolt 135 for hand twisting. Also, because the bottoms of two clamping portions 132 & 133 on the clamping head 12 are pivotally connected, the clamping portion 133 can be twisted open so as to clamp the appended portion 22 of the lower rod 20. On the other hand, when the screw bolt 135 is twisted tight, the two clamping portions 132 & 133 can meet so as to clamp the appended portion 22 tightly as well as diminish the size of the opening 131. Besides, because the inner wall of the appended portion 22 is distributed with floral pattern veins, it can prevent the clamping head 12 on the upper rod 10 from sliding. Therefore, the upper rod 10 can make stepless swivels on the appended portion 22 of the lower rod 20, which in turn can facilitate the drummer to steplessly fine-tune an angle for the cymbal.

Moreover, in order to prevent the upper rod 10 from falling due to vibrations, the through bolt 30 is inserted into the clamping head 12 from its outer side. Then, the force applied on the bolt head 31 will activate the bearing body 33 to push the soft washer 32 so that the soft washer 32 can be closely attached to the outer wall of the clamping head 12. Next, the butterfly nut 34 is used to screw the other end of the through bolt 30 tightly so that the clamping head 12 can be prevented from dropping. It should be noted that the shielding body 331 extending from the inner side of the bearing body 33 can be inserted into the opening 131 on the clamping slot 13 of the upper rod 10 to perform a shielding effect so that when the butterfly nut 34 is twisted for tightening, the through bolt 30 will not spin along with the butterfly nut 34.

Figure 5:
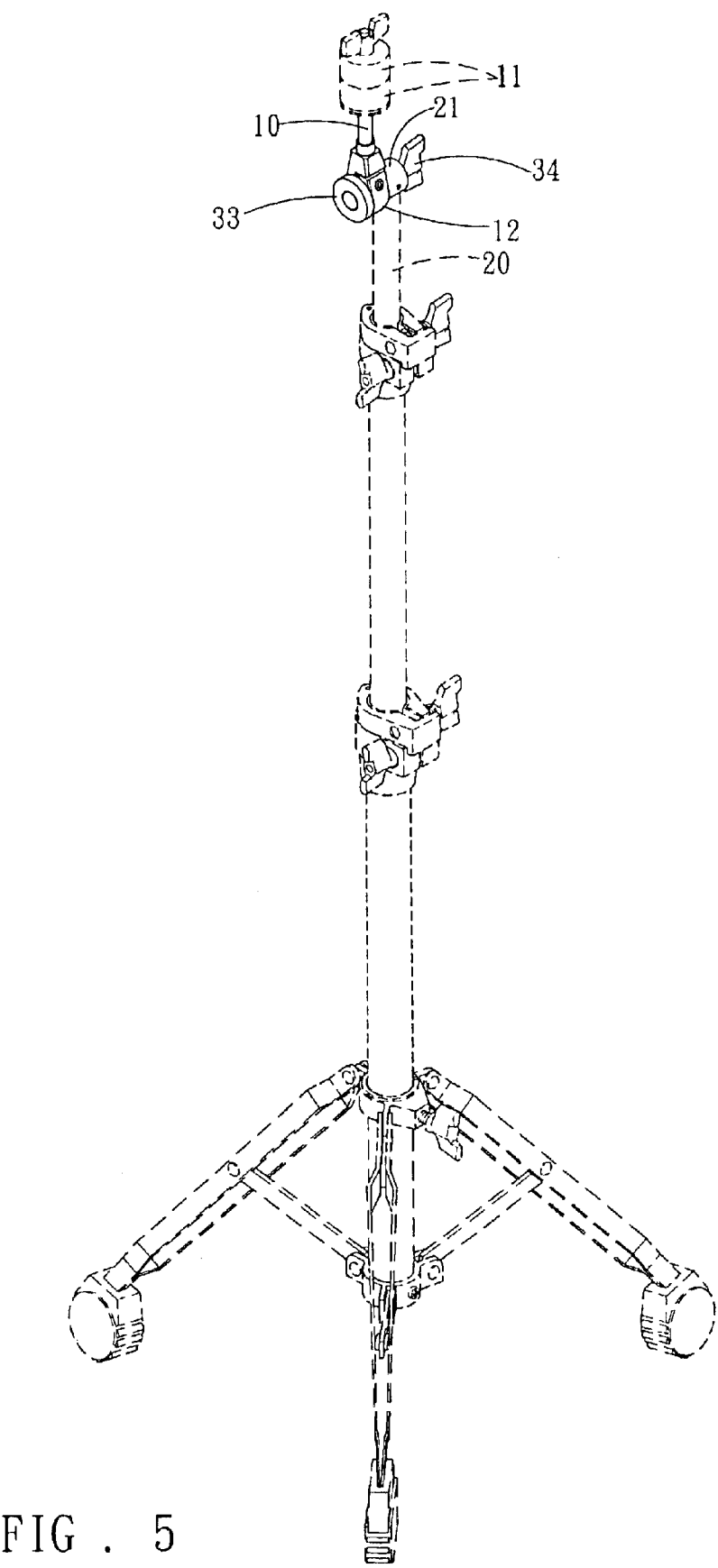
FIG. 5 is a perspective view showing that the first embodiment of the invention is assembled on the cymbal stand.

Also, the design of bent clamping slot 13 on the clamping head 12 of the upper rod 10 enables the two pivotally connected clamping portions 132 & 133 to hold the appended portion 22 of the lower rod 20 in a movable manner. The screw bolt 135 can enter the hole 134 horizontally, and when the spanner 14 twists the head 136 of the screw bolt 135, the lower rod 20 will not hinder the twisting job. Therefore, when the upper rod 10 is adjusted to match the angle made by a drummer for striking a cymbal, the drummer's hand can twist the spanner 14 smoothly until the screw is tightened without the hand being obstructed by the limited space. Hence, the advantage that the spanner operation will not be obstructed can be achieved, as shown in FIGS. 4 and 5.

Figure 6:
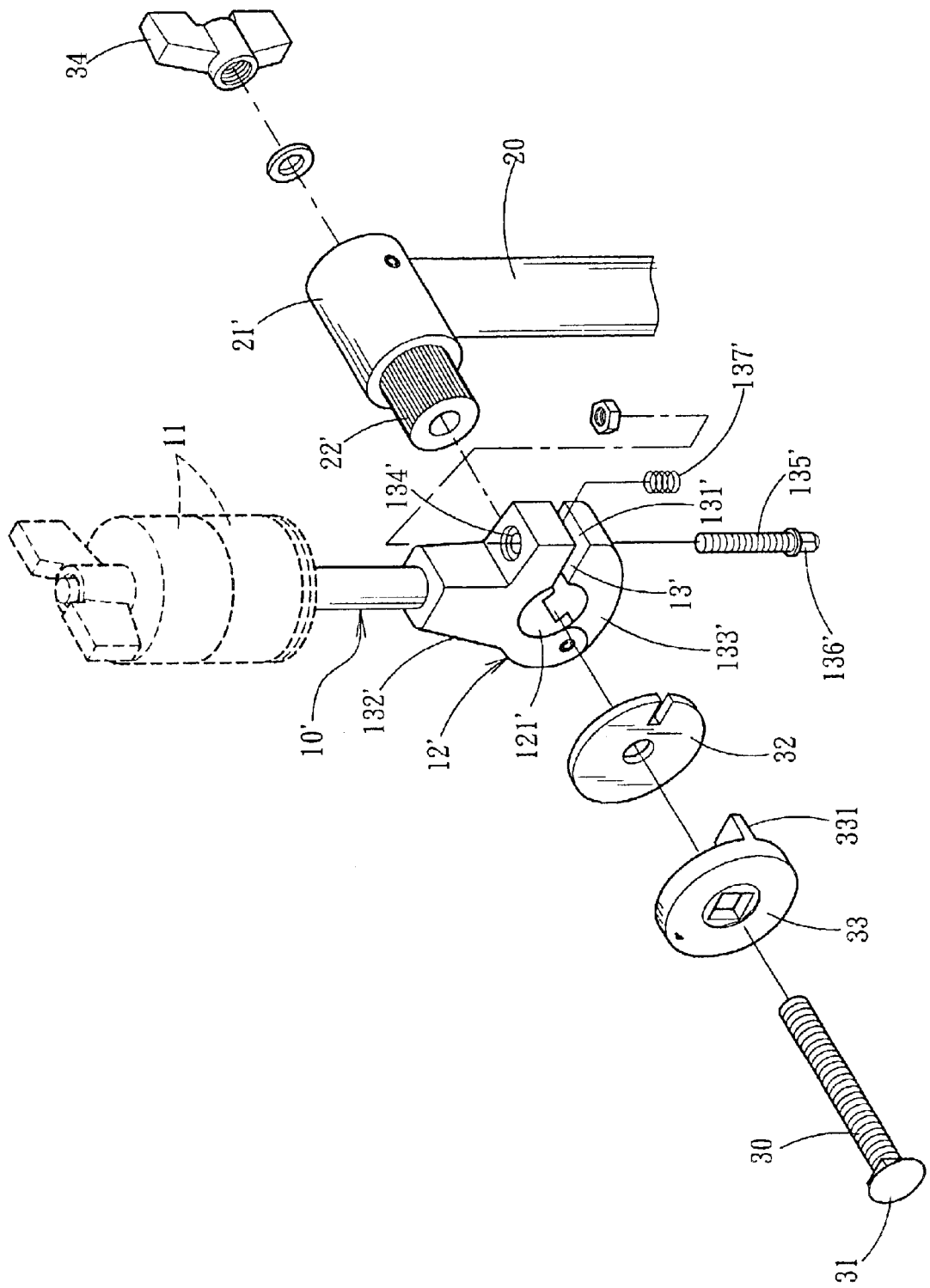
FIG. 6 is a three-dimensional exploded view of the second embodiment of the invention.
Figure 7:
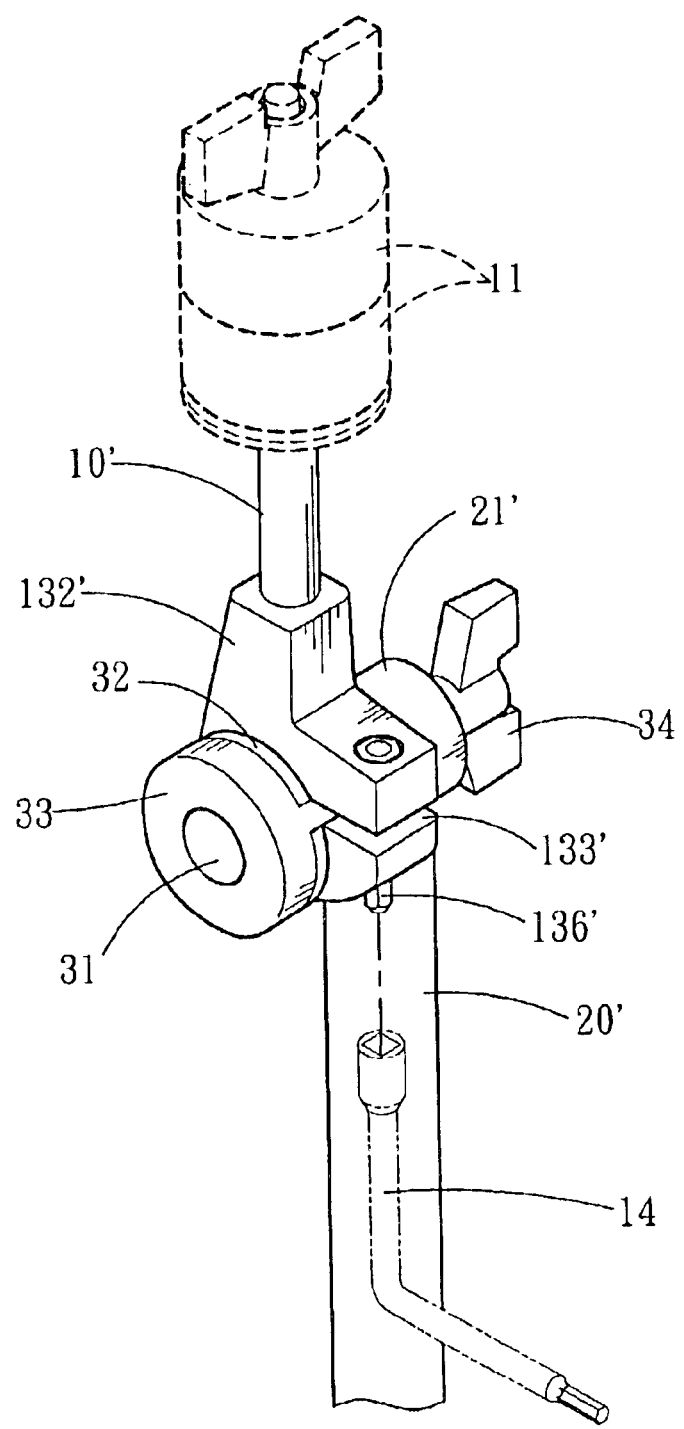
FIG. 7 is a three-dimensional assembly of the second embodiment of the invention.

Further, referring to FIGS. 6 and 7, the second embodiment of the invention is disclosed. The second embodiment differs from the first embodiment in composition of the clamping head 12' at the bottom of the upper rod 10'. The clamping head 12' is composed of an upper clamping portion 132' and a lower clamping portion 133' that are pivotally connected together, which allows the pivotally connecting point to be located at one side of the clamping head 12'. Besides, the inner side of the clamping slot 13' can pass through the central hole 121', whereas the opening 131' of the clamping slot 13' is facing outwards. Also, a hole 134' is provided on each of the two clamping portions 132' & 133' vertically so that a screw bolt 135' can be inserted into the holes 134' from downside to the upside to conjoin the two clamping portions 132' & 133' and then into a spring 137, and finally a screw nut is used to screw all the relative components together. By doing so, the spanner 14 can also be engaged with the head 136' of the screw bolt 135' to twist the screw bolt 135' tightly. Thus, the two clamping portions 132' & 133' can clamp on the appended portion 22' of the lower rod 20' to achieve the effect of steplessly adjusting angle for a cymbal.

What is claimed is:

1. A structure of steplessly adjusting angle for a cymbal, including:

an upper rod, wherein the top of upper rod is provided to screw a cymbal; a clamping head is provided at the bottom of the upper rod, and a central hole is provided in the clamping head; a clamping slot is provided in the axial direction of the central hole passing through the central hole, while the clamping slot is bent so that its opening is facing outwards horizontally; the clamping head is composed of two clamping portions that are pivotally connected together, and a conjoining component can be inserted into the two clamping portions, and a head portion is provided on top of the lower rod, and an appended portion is provided at the outer side of the head portion; a core hole is provided in the appended portion passing through to another side of the head portion so as to be entered and screwed by a bearing component.

2. The structure of steplessly adjusting angle for a cymbal as claimed in claim 1, wherein the bearing component is a through bolt, which is inserted into a bearing body and a soft washer to conjoin them together, whereas the other end of the through bolt is screwed by a screw nut.

3. The structure of steplessly adjusting angle for a cymbal as claimed in claim 2, wherein the screw nut is a butterfly nut.

4. The structure of steplessly adjusting angle for a cymbal as claimed in claim 1, wherein the two clamping portions can correspond to each other in an up-and-down position so that their pivotally connected point can be located at one side of the clamping head; a clamping slot is formed at the other side of the clamping head, wherein one end of the clamping slot can pass through the central hole of the clamping head, whereas the other end of the clamping slot is an opening facing outwards; a hole is provided on each of the two clamping portions vertically for being entered and screwed by the conjoining component.

5. The structure of steplessly adjusting angle for a cymbal as claimed in claim 1, wherein the conjoining component is a screw bolt; a hole is provided on each of the two clamping portions so that the screw bolt can be inserted in and screwed by a screw nut; also, a spring is provided between the two clamping portions.

6. The structure of steplessly adjusting angle for a cymbal as claimed in claim 5, wherein a head portion is provided at one end of the screw bolt for being engaged with a spanner.

7. A structure of steplessly adjusting angle for a cymbal, including:

an upper rod, wherein the top of upper rod is provided to screw a cymbal; a clamping head is provided at the bottom of the upper rod, and a central hole is provided in the clamping head; a clamping slot is provided in the axial direction of the central hole passing through the central hole, while the clamping slot is bent so that its opening is facing outwards horizontally; the clamping head is composed of two clamping portions that are pivotally connected together, and a conjoining component can be inserted into the two clamping portions, and the two clamping portions can correspond to each other in an up-and-down position so that their pivotally connected point can be located at one side of the clamping head; a clamping slot is formed at the other side of the clamping head, wherein one end of the clamping slot can pass through the central hole of the clamping head, whereas the other end of the clamping slot is an opening facing outwards; a hole is provided on each of the two clamping portions vertically for being entered and screwed by the conjoining component.

8. A structure of steplessly adjusting angle for a cymbal, including:

an upper rod, wherein the top of upper rod is provided to screw a cymbal; a clamping head is provided at the bottom of the upper rod, and a central hole is provided in the clamping head; a clamping slot is provided in the axial direction of the central hole passing through the central hole, while the clamping slot is bent so that its opening is facing outwards horizontally; the clamping head is composed of two clamping portions that are pivotally connected together, and a conjoining component can be inserted into the two clamping portions, and the conjoining component is a screw bolt; a hole is provided on each of the two clamping portions so that the screw bolt can be inserted in and screwed by a screw nut; a spring is provided between the two clamping portions.

9. The structure of steplessly adjusting angle for a cymbal as claimed in claim 8, wherein a head portion is provided at one end of the screw bolt for being engaged with a spanner.

* * * * *